(12) United States Patent
Kahn et al.

(10) Patent No.: US 6,636,909 B1
(45) Date of Patent: Oct. 21, 2003

(54) ADAPTIVE THROTTLING FOR FIBER CHANNEL DISKS

(75) Inventors: James Kahn, San Jose, CA (US); Robert S. Tracy, Golden, CO (US)

(73) Assignee: Sun Microsystems, Inc., Santa Clara, CA (US)

( * ) Notice: Subject to any disclaimer, the term of this patent is extended or adjusted under 35 U.S.C. 154(b) by 536 days.

(21) Appl. No.: 09/610,847

(22) Filed: Jul. 5, 2000

(51) Int. Cl.[7] .................. G06F 13/00; G06F 3/06; G06F 13/38
(52) U.S. Cl. .................. 710/60; 710/29; 710/52; 710/53; 710/54; 710/56; 710/57; 710/310
(58) Field of Search .................. 710/52–54, 56–58, 710/29, 60, 310

(56) References Cited

U.S. PATENT DOCUMENTS

| | | | | | |
|---|---|---|---|---|---|
| 4,258,418 A | * | 3/1981 | Heath | .................. | 710/53 |
| 5,659,799 A | * | 8/1997 | Wu et al. | .................. | 710/57 |
| 5,771,356 A | * | 6/1998 | Leger et al. | .................. | 709/233 |
| 5,802,310 A | * | 9/1998 | Rajaraman | .................. | 709/234 |
| 6,154,794 A | * | 11/2000 | Abdalla et al. | .................. | 710/29 |
| 6,275,896 B1 | * | 8/2001 | Kojima | .................. | 711/112 |
| 6,349,354 B1 | * | 2/2002 | Garney | .................. | 710/313 |

* cited by examiner

*Primary Examiner*—Jeffrey Gaffin
*Assistant Examiner*—Tanh Q. Nguyen
(74) *Attorney, Agent, or Firm*—Blakely Sokoloff Taylor & Zafman, LLP

(57) ABSTRACT

According to the invention, systems, apparatus and methods are disclosed for throttling commands to a storage device is disclosed. This method comprises sending a write request to a disk, receiving a queue full signal from the disk if the disk queue is full, and responsive to receiving the queue full signal setting a throttle value.

30 Claims, 11 Drawing Sheets

ADAPTIVE THROTTLING FOR FIBER CHANNEL DISKS

FIELD OF THE INVENTION

This invention relates to control of storage devices in general, and more specifically to a device driver for a storage device employing an adaptive throttling technique that dynamically reduces/increases the number of commands that can be issued to a storage device, such as a Fiber Channel disk, to avoid overloading the storage device.

BACKGROUND OF THE INVENTION

Increasing demand on computer network systems has created a need for high-performance communications between servers and storage devices and servers and other devices. Fiber Channel is a high-speed, full-duplex, serial data transfer architecture that uses optical fiber to connect various devices such as servers and storage devices. Fiber Channel supports multiple protocols including Small Computer System Interface (SCSI) and Internet Protocol (IP). Storage devices connected to a Fiber Channel network operate with both SCSI and networking (IP) protocols. Servers and workstations can use the Fiber Channel network for high-speed, shared access to the same storage device or system such as a Redundant Array of Independent Disks (RAID). Fiber Channel has supported both peer-to-peer and arbitrated loop topologies and will support a fabric topology.

FIG. 1 is a block diagram illustrating a Fiber Channel peer-to-peer network. This topology consists of a single computer 100 and a single storage device 110 such as an individual disk or a disk array. The computer 100 and the storage device 110 are interconnected using a Fiber Channel cable 105. The computer 100 can communicate with the storage device 110 using Fiber Channel protocol transmitted over the Fiber Channel cable 105. The Fiber Channel protocol can contain SCSI commands issued by the computer 100 to the storage device 110.

FIG. 2 is a block diagram illustrating a Fiber Channel arbitrated loop network. This topology consists of at least one computer 200 and several other devices 210, 215, and 220. These devices can be storage devices such as a disks or arrays of disks, printers, or other peripheral devices. These devices are interconnected using a Fiber Channel cable 205. The computer 200 can communicate with the other devices 210–220 using Fiber Channel protocol transmitted over the Fiber Channel cable 205. Control of the loop can be based on token passing or another arbitration scheme. When the computer 200 communicates with storage devices in the network, the Fiber Channel protocol can contain SCSI commands issued by the computer 200 to the storage device.

FIG. 3 is a block diagram illustrating a Fiber Channel fabric based network. This topology consists of at least one computer 300, at least one switch 310, and a number of other devices 315–325. These devices can consist of other computers, other switches, disks, printers or other peripheral devices. These devices are interconnected using a Fiber Channel cable 305. The nature of such a fabric allows the network to be easily expanded and creates great flexibility. Therefore, many layouts different from that illustrated in FIG. 3 can be imagined. The computer 300 can communicate with other devices 315–325 on the fabric through the switch 310. To communicate with a storage device the computer 300 transmits a frame containing Fiber Channel protocol and SCSI commands through the switch 310 to the storage device.

In each topology a problem can arise when Fiber Channel is used to connect a Fiber Channel SCSI disk drive. For these drive types, the Fiber Channel commands along with the SCSI commands require more memory, firmware code, and time for the processors in the storage devices to handle than SCSI commands alone. This increased processing time combined with the increased speed of the Fiber Channel network means that the storage device's processor may not be able to respond before the arrival of the next frame. Since the storage device has an internal queue, this is normally not a problem. However, if the queue becomes full, the computer may send additional frames before the storage device can signal the full condition to the computer.

FIG. 4 is a block diagram illustrating exemplary handshaking between an initiator and a storage device. In this example a computer 400 issues a write command 405 to a disk drive. Normally, a write command 405 generated at the computer 400 is submitted to the file system 410. The file system 410 then passes the write command 405 to the software disk driver 415 that issues the command to a bus interface 420, such as a host bus adapter. The bus interface 420 is connected to a disk 435. The bus interface issues the write command to the disk 435 that then processes the command and responds back 425 to the bus interface 420. The bus interface 420 then passes the response back to the software disk driver 415. Finally, completion information associated with the response may be provided by the software disk driver 415 to the file system 410.

FIG. 5 is a block diagram illustrating a computer 500 issuing a write command 505 to a disk drive 535 when the disk's queue is full. Normally, the write command 505 generated at the computer 500 is submitted to the file system 510. The file system 510 then passes the write command to the software disk driver 515 which issues the command to a bus interface 520 such as a host bus adapter. The bus interface 520 issues the write command 530 to the disk 535 which then processes the command and responds back 525 to the bus interface 520. The bus interface 520 then passes the response back to the software disk driver 515. Finally, completion information associated with the response may be provided by the software disk driver 515 to the file system 510.

When the disk 535 receives the command, the disk temporarily stores the command in a queue (not shown) until it can be processed. If the queue becomes full, the disk 535 returns a queue full signal 525 to the bus interface 520. Additionally, if the host bus adapter is busy, it may return a busy signal to the software disk driver 515. In either case the command has returned to the software disk driver 515 without being processed by the disk 535.

Since the Fiber Channel protocol may include SCSI commands as well as other commands, the Fiber Channel protocol is more processor intensive than SCSI alone. Consequently, the processing of Fiber Channel protocol takes considerably longer. Typically, SCSI disks can respond to a write request with a queue full signal quickly. However, because of the increased load on the disk's processing resources due to the Fiber Channel protocol, a disk connected to a Fiber Channel network may take longer than normal to respond to a write request.

Normally, a disk responds to a write command with a queue full signal before the queue is completely full. Therefore, a disk can still receive some commands even after a queue full signal has been sent. However, problems occur when a disk is receiving commands faster than it can clear the queue. If the disk continues to receive commands after the occurrence of a queue full condition the queue can be exceeded and several commands can be sent and missed (e.g., silently dropped by the disk). In this event, the missed commands result in a timeout error being sent from the host bus adapter to the software disk driver.

In the peer-to-peer topology this problem has been easy to address. The simple solution for this situation is to limit the number of commands a device may send to the storage device to the maximum number of commands that the storage device can handle. For example, if the storage device has a queue depth of 64 commands, the computer may be limited to issuing no more than 64 commands at one time (e.g., no more than 64 commands may be pending). In this way the storage device's queue will never be exceeded.

In the arbitrated loop topology the problem is still relatively easy to solve by limiting the number of devices that may be on the loop and hardcoding the maximum number of commands that may be issued. Assuming the loop is limited to having four initiators, the maximum number of commands that any one device may issue at one time may be limited to the maximum number of commands a disk can handle divided by four. For example, if the storage device has a queue depth of 64 commands, the computers in the network may be limited to having no more than 16 (64 divided by 4) commands pending. In this way the storage device's queue will never be exceeded. In other instances there may be more than four initiators on the loop. In such a cause the limit should be the queue depth divided by the number of initiators.

In a fabric topology, this problem becomes much more difficult to solve. Because of the nature of the fabric topology an indeterminant number of devices may be connected to the network at one time. Therefore, limiting or throttling the number of commands a device can issue at one time based on the number of devices connected to the network becomes impractical.

SUMMARY OF THE INVENTION

According to one aspect of the invention, a method and apparatus for throttling commands to a storage device is disclosed. This method comprises sending a write request to a disk, receiving a queue full signal from the disk if the disk queue is full, and responsive to receiving the queue full signal setting a throttle value.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DETAILED DESCRIPTION

Figure 1:
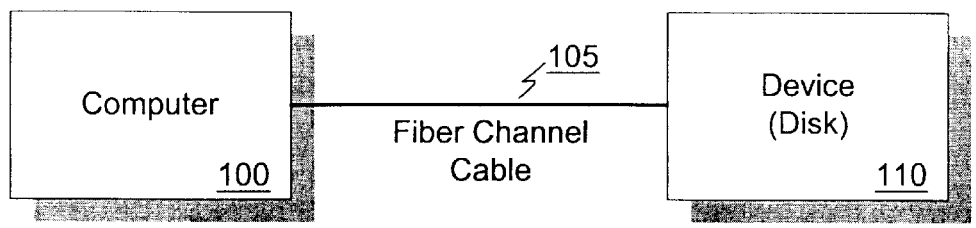
FIG. 1 is a block diagram illustrating a Fiber Channel peer-to-peer network.
Figure 2:
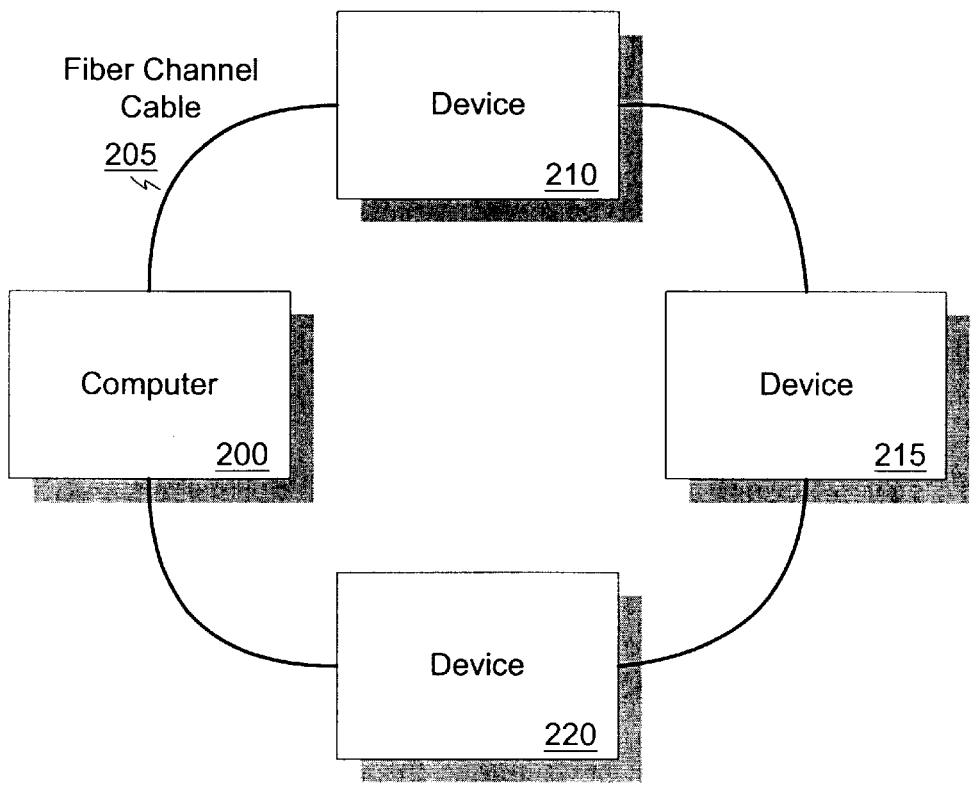
FIG. 2 is a block diagram illustrating a Fiber Channel arbitrated loop network.
Figure 3:
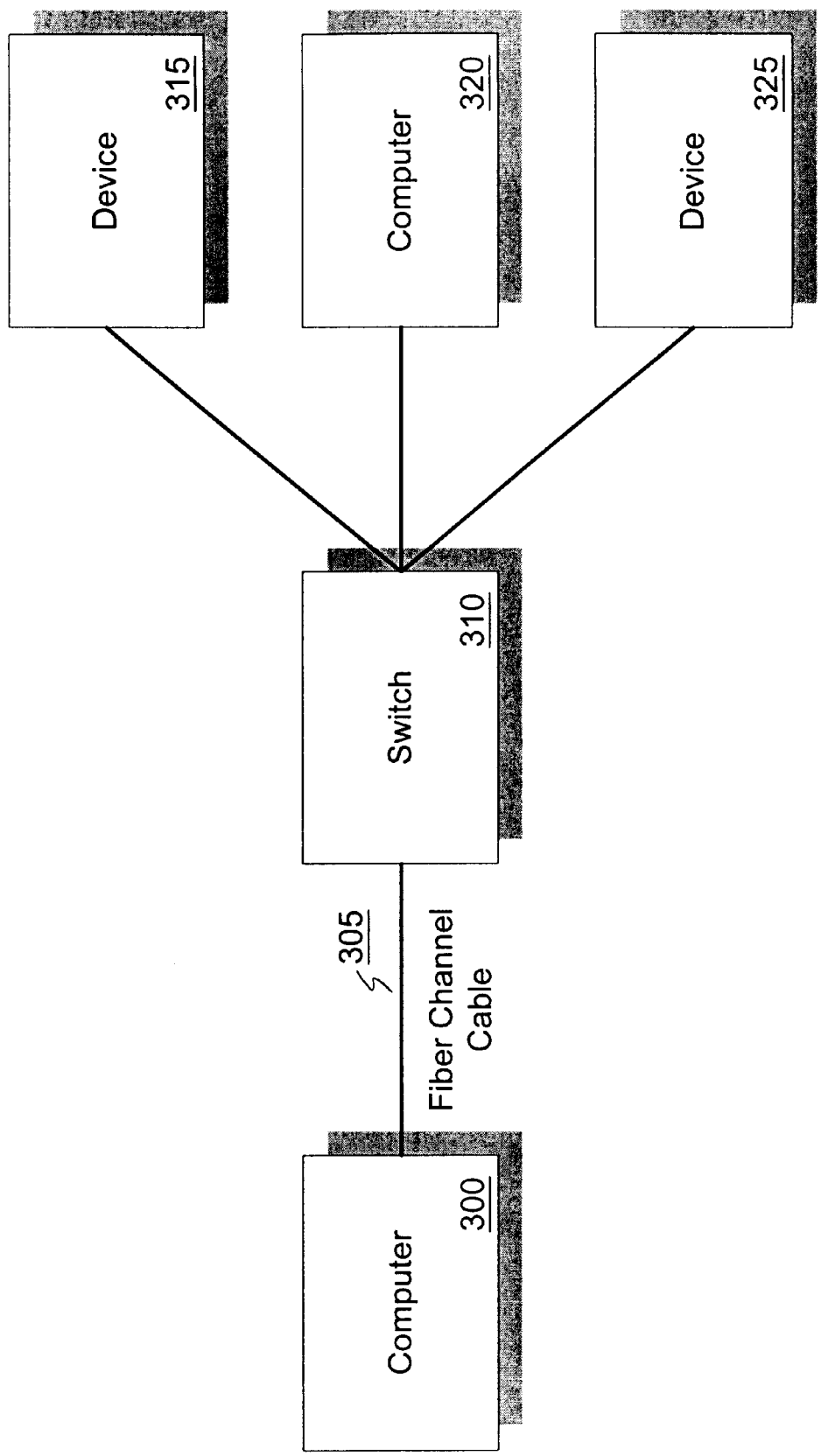
FIG. 3 is a block diagram illustrating a Fiber Channel fabric based network.

A method and apparatus are described for throttling commands to a storage device is disclosed. Broadly stated, embodiments of the present invention seek to avoid triggering a queue full status for a storage device by queueing commands that would overload the storage device in a local software disk driver queue. Since a predefined limit on command issuance is not feasible, initiator devices must be able to recognize potential error producing situations and thereafter limit or throttle the number of commands issued. According to one embodiment, this method comprises sending a write request to a disk, receiving a queue full signal from the disk if the disk queue is full, and responsive to receiving the queue full signal setting a throttle value and thereafter dynamically adjusting the throttle value to maintain the storage device in a steady state.

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various steps, which will be described below. The steps of the present invention may be performed by hardware components or may be embodied in machine-executable instructions, which may be used to cause a general-purpose or special-purpose processor or logic circuits programmed with the instructions to perform the steps. Alternatively, the steps may be performed by a combination of hardware and software.

The present invention may be provided as a computer program product which may include a machine-readable medium having stored thereon instructions which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Importantly, while embodiments of the present invention will be described with reference to Fiber Channel protocol, the method and apparatus described herein are equally applicable to other protocols. For example, the techniques described herein are thought to be useful in connection with SCSI.

As explained above, the Fiber Channel protocol may contain Fiber Channel commands as well as SCSI commands. The additional protocol creates an increased demand on the processing resources of the storage device. This increased processing time combined with the increased speed of the Fiber Channel network means that the storage device's processor may not be able to respond before the arrival of the next command. Since the storage device has an internal queue, this is normally not a problem. However, if the queue becomes full, the computer may send additional commands before the storage device can signal the full condition to the computer.

In a fabric topology, this problem becomes much more difficult to solve. Because of the nature of the fabric topology an indeterminant number of devices may be connected to the fabric at one time. Therefore, limiting or throttling the number of commands a device can issue based on the number of devices connected to the fabric becomes impractical. Since a predefined limit is not feasible, the devices need to recognize the potential error producing situations and thereafter limit or throttle the number of commands issued.

Figure 6:
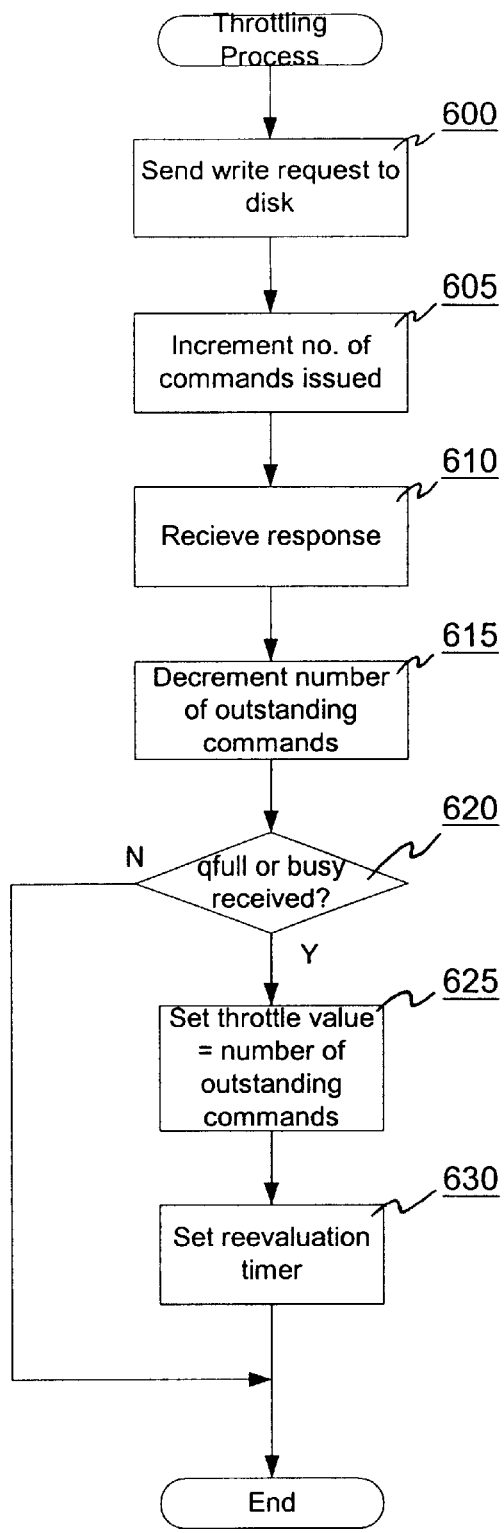
FIG. 6 is a flowchart illustrating throttling of commands issued to a disk according to one embodiment of the present invention.

FIG. 6 is a flowchart illustrating throttling of commands issued to a disk according to one embodiment of the present invention. First, a write request is sent to the disk at processing block 600 and the number of commands issued is incremented at processing block 605. A response to the command is received from the disk drive at processing block 610. The response can indicate a successful completion of the command, queue full, or device busy as well as others. In any event, the number of outstanding commands is then decremented at processing block 615. If a queue full signal was received at processing block 620 the throttle value is set to the number of outstanding commands at processing block 625 and a reevaluation timer is set at processing block 630.

Figure 4:
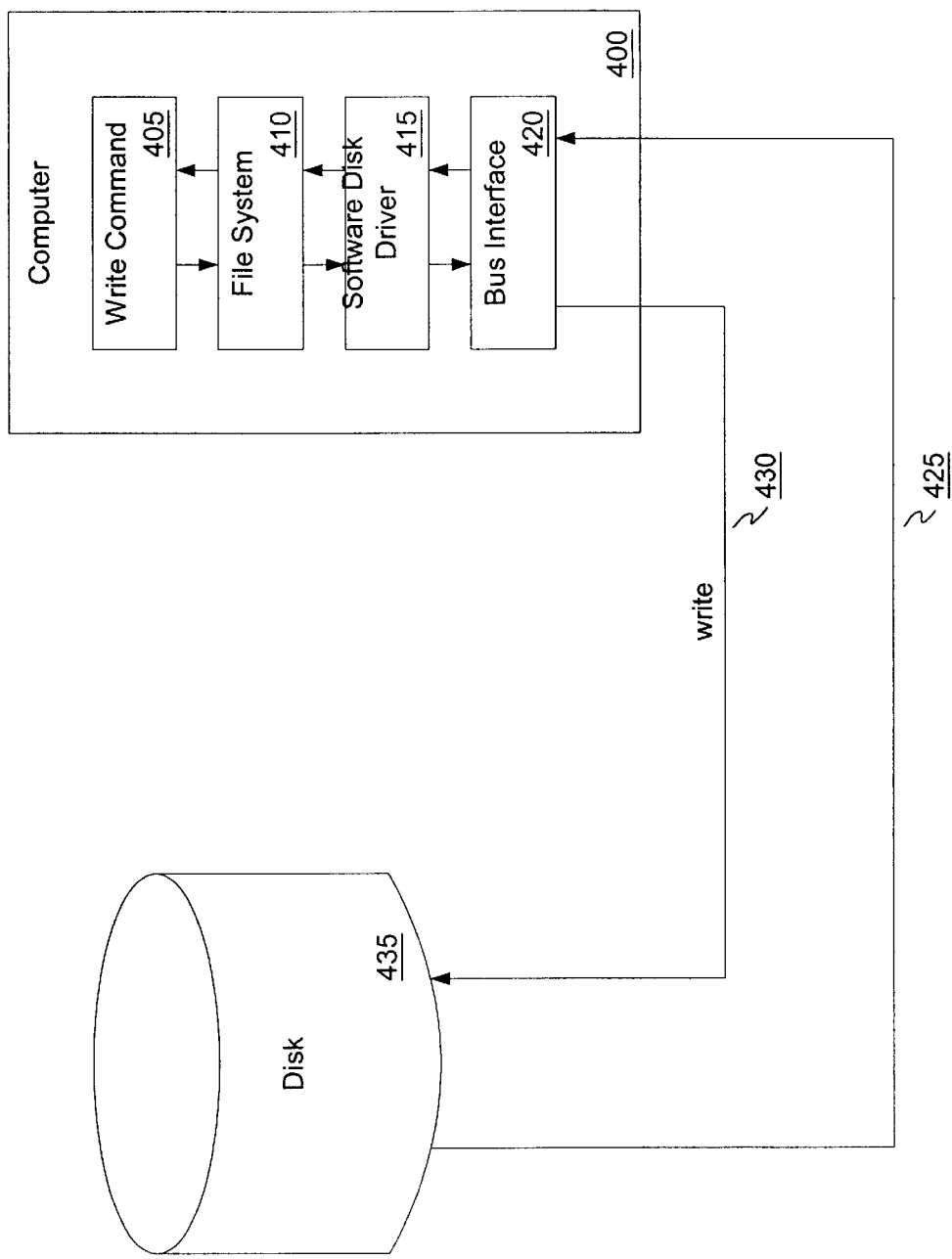
FIG. 4 is a block diagram illustrating exemplary handshaking between an initiator and a storage device.
Figure 5:
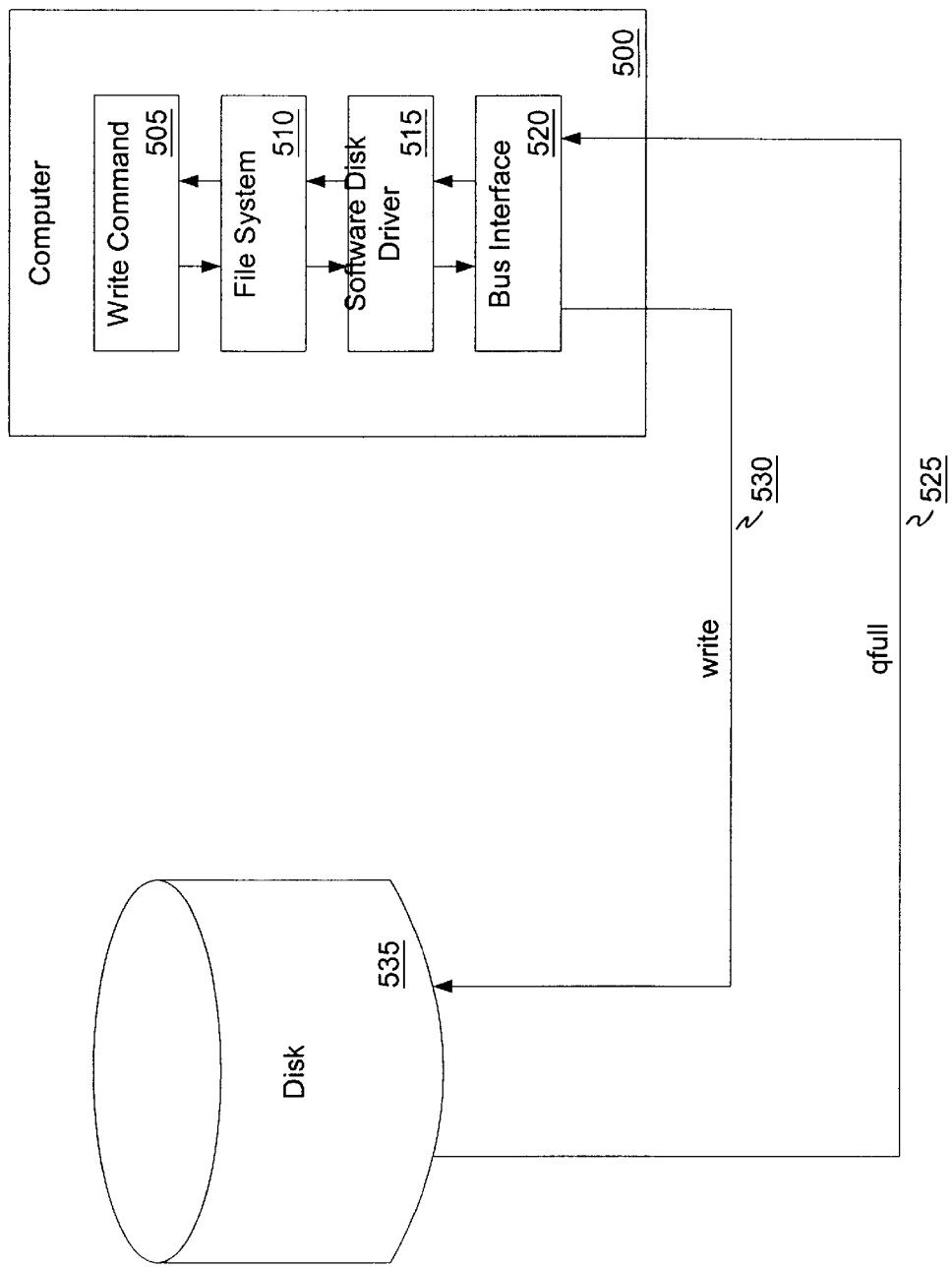
FIG. 5 is a block diagram illustrating a computer issuing a write command to a disk drive when the disk drive's queue is full.
Figure 7:
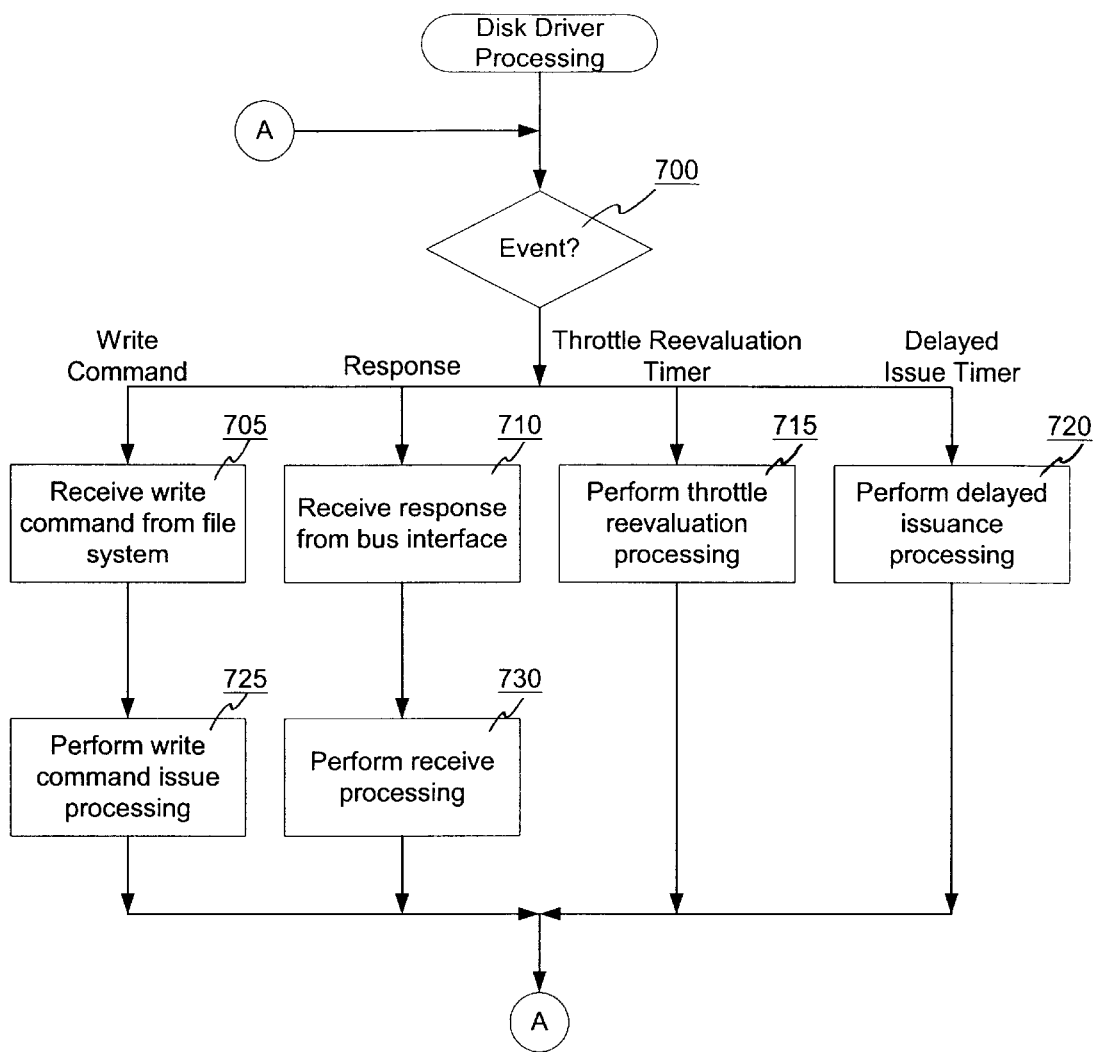
FIG. 7 is a high-level flowchart illustrating disk driver processing according to one embodiment of the present invention.

FIG. 7 is a high-level flowchart illustrating disk driver processing according to one embodiment of the present invention. According to one embodiment of the present invention, a software disk driver 415 such as illustrated in FIG. 4 would normally perform this process. First, the process branches based on an event at decision block 700. If the event is a write command, the command is received at processing block 705 and write command issue processing is performed at processing block 725. If the event is a response to a write command from a storage device, the response is received from the bus interface at processing block 710 and the receive process is performed at processing block 730. If the throttle reevaluation timer has expired, the throttle reevaluation process is performed at processing block 715. Finally, if the delayed issue timer has expired the delayed issuance process is performed at processing block 720. Each of these processes will be described in greater detail below.

Figure 8:
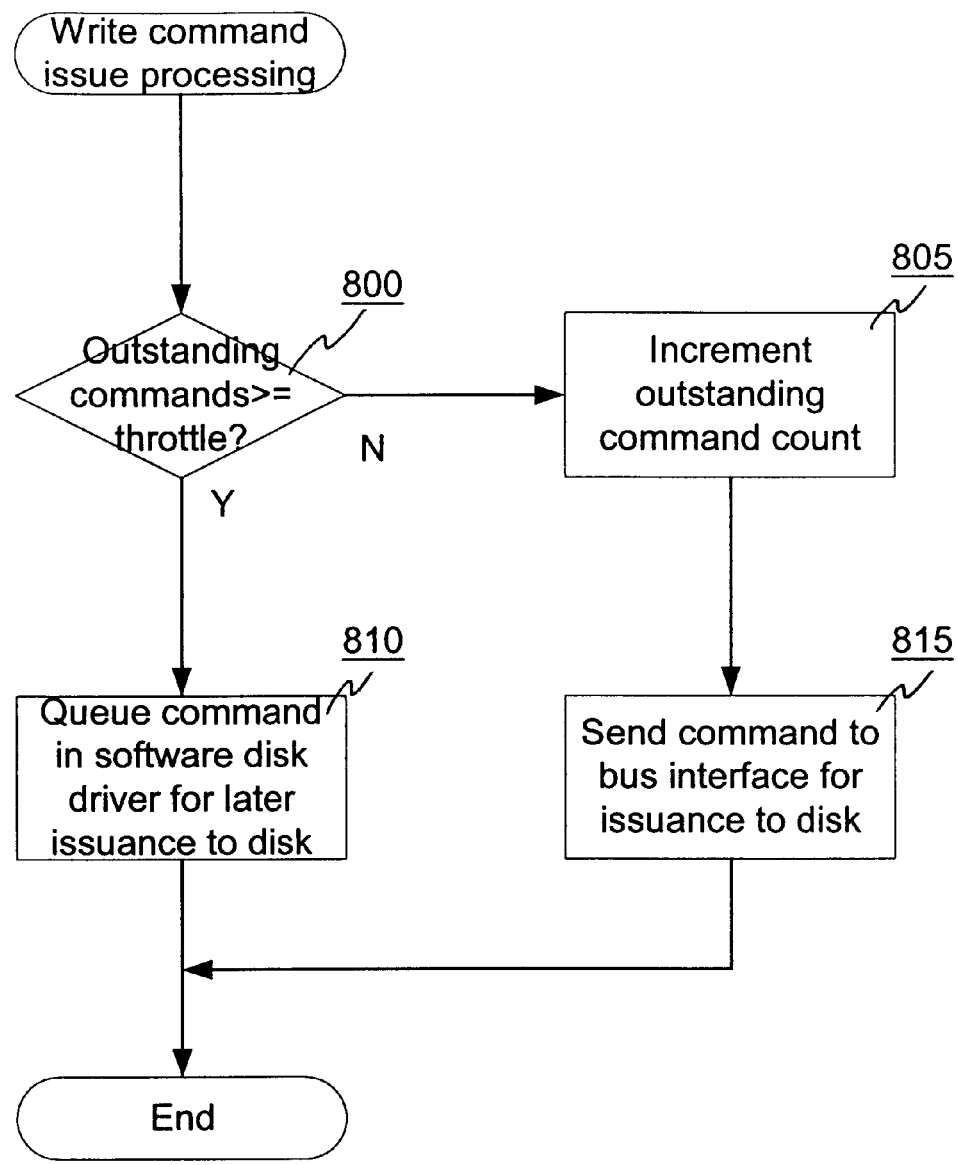
FIG. 8 is a flowchart illustrating write command issue processing according to one embodiment of the present invention.

FIG. 8 is a flowchart illustrating write command issue processing according to one embodiment of the present invention. If the number of pending commands is greater than or equal to the throttle value at decision block 800, the command is queued in the software disk driver for later issuance to the disk at processing block 810. In other words, if the throttle value is reached or exceeded, the command will not be sent to the disk but instead stored in a software queue by the software disk driver. If the number of pending commands is not greater than or equal to the throttle value at decision block 800, the count of pending commands is incremented at processing block 805 and the command is sent to the bus interface for issuance to the disk at processing block 815.

Figure 9:
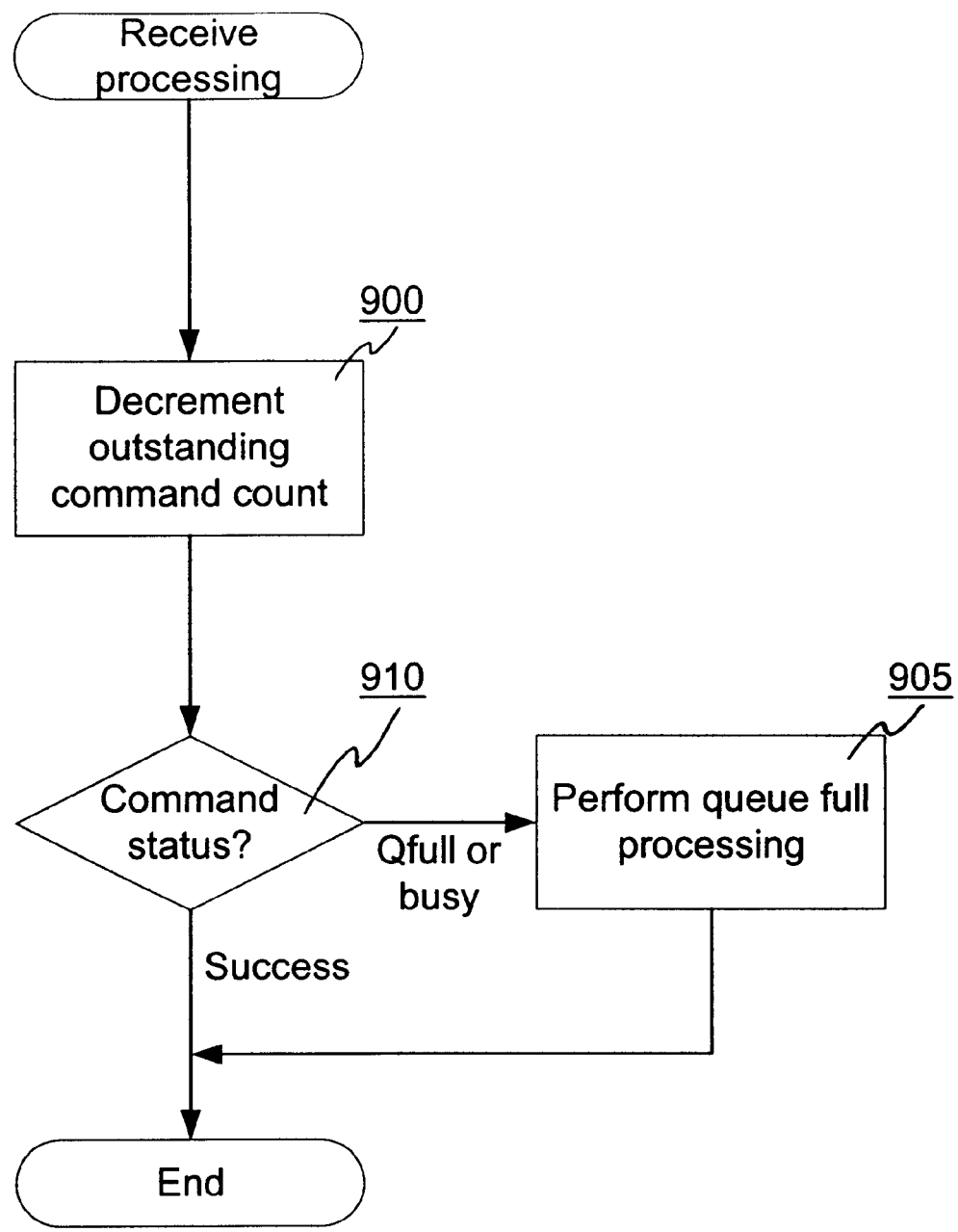
FIG. 9 is a flowchart illustrating receive processing according to one embodiment of the present invention.

FIG. 9 is a flowchart illustrating receive processing according to one embodiment of the present invention. When a response is received from a storage device the pending command count is decremented at processing block 900. The status of the response is checked at decision block 910. If the status indicates that the write was successful no further processing is performed at processing block 910. If the status indicates that the storage device's queue is full or the bus interface is busy at decision block 910, queue full/busy processing is performed at processing block 905.

Figure 10:
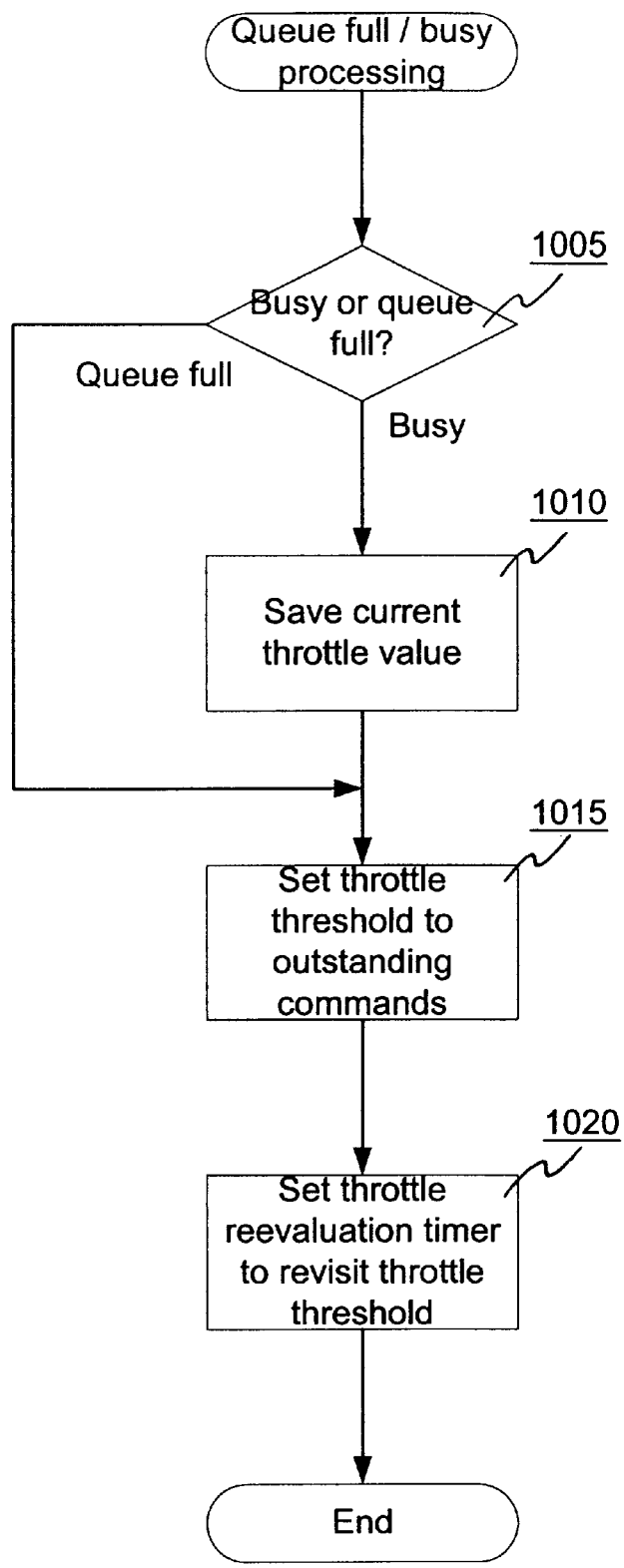
FIG. 10 is a flowchart illustrating queue full/busy processing according to one embodiment of the present invention.

FIG. 10 is a flowchart illustrating queue full/busy processing according to one embodiment of the present invention. If the processing was initiated because of a busy signal at decision block 1005, the current throttle value is saved at processing block 1010. Next, the throttle threshold is set to the number of outstanding commands at processing block 1015. This fixes the throttle value at the current number of outstanding commands (i.e. the throttle value is preserved). Finally, the throttle reevaluation timer is set to revisit the throttle value after a predetermined time at processing block 1020.

Figure 11:
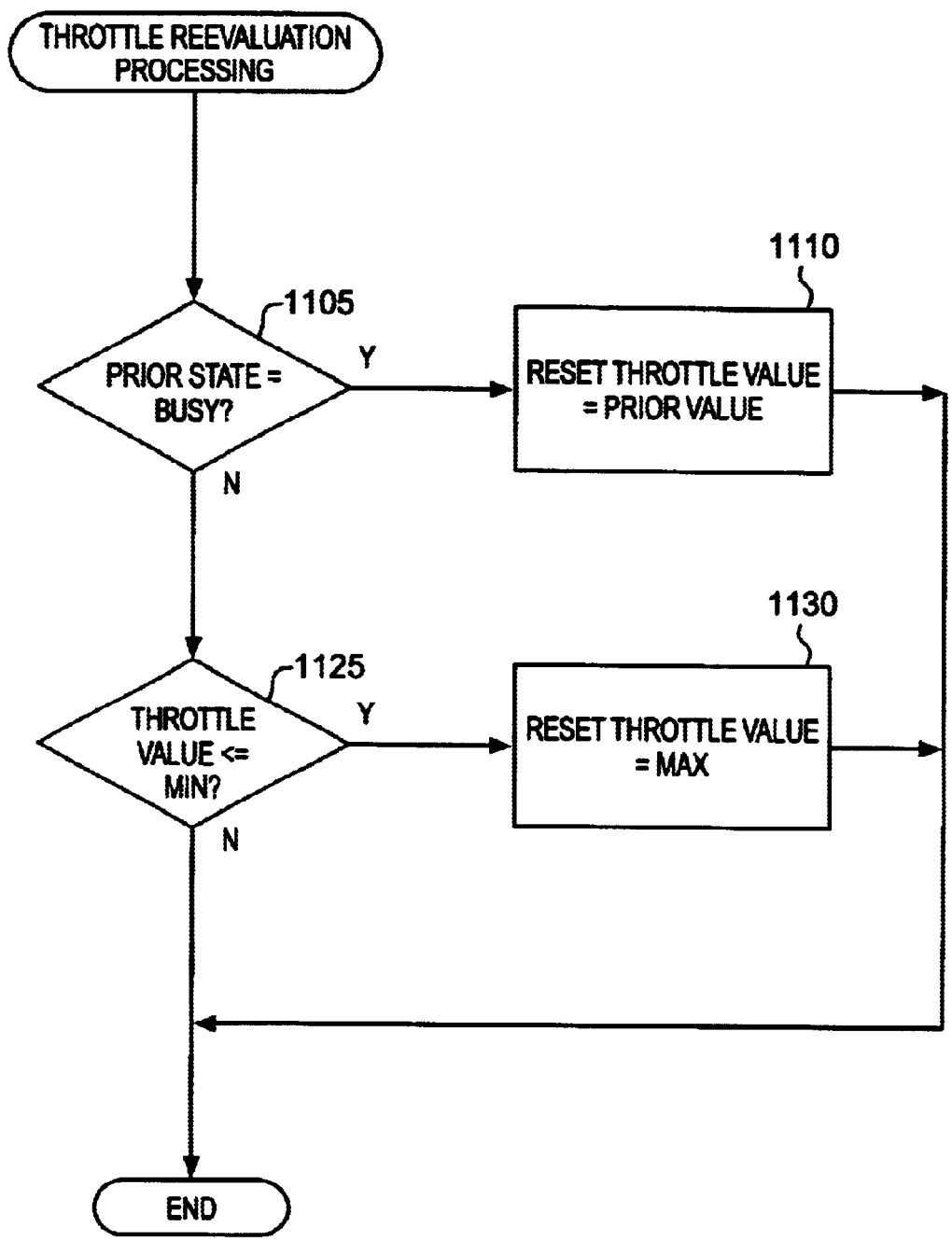
FIG. 11 is a flowchart illustrating throttle reevaluation processing according to one embodiment of the present invention.

FIG. 11 is a flowchart illustrating throttle reevaluation processing according to one embodiment of the present invention. If the prior state found in the receive process was a bus interface busy at decision block 1105, the throttle value is reset to the previous throttle value at processing block 1110. If the throttle value is less than or equal to a predetermined minimum at decision block 1125, the throttle value is reset to a predetermined maximum at processing block 1130. As explained above with reference to FIG. 6, this method helps maintain performance while throttling commands to prevent data loss.

According to one embodiment of the present invention, the distinction between storage device queue full and bus adapter busy may be based on different signals sent to the software disk driver from the bus adapter to indicate the different conditions. Alternatively, if the bus adapter does not distinguish between the conditions and sends only one signal to indicate either condition, the distinction may be based on the continued presence of the signal after the expiration of the timer. If the signal is no longer present after the expiration of the timer, the signal is considered to be due to a bus adapter busy condition.

Figure 12:
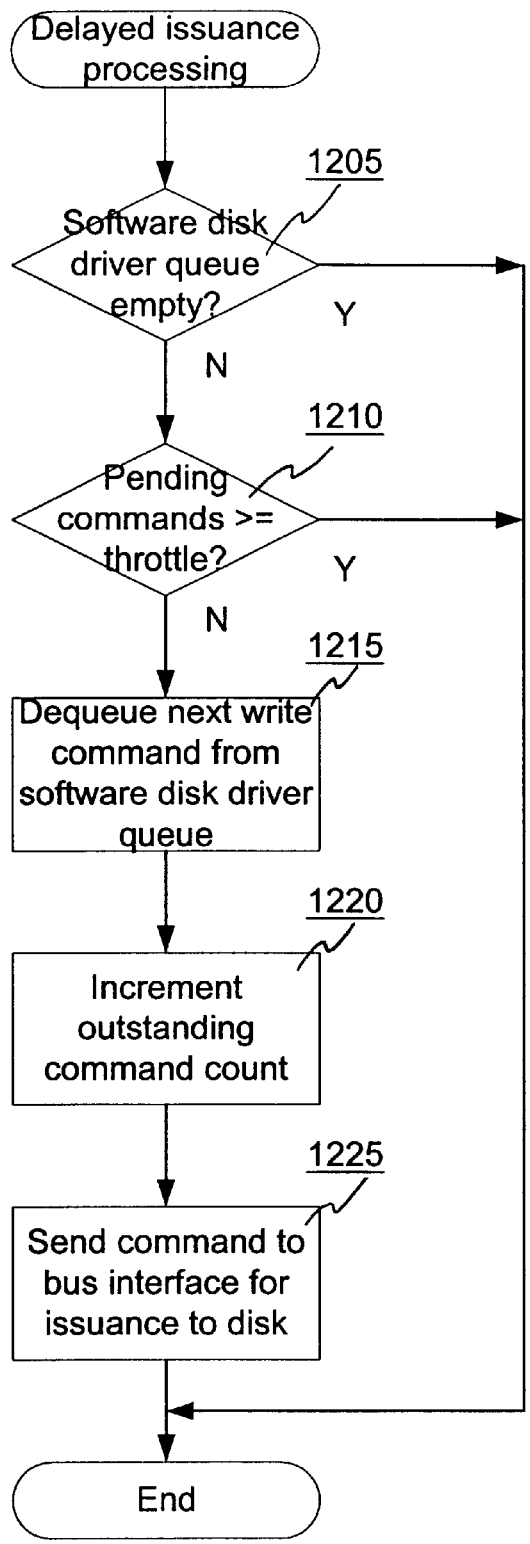
FIG. 12 is a flowchart illustrating delayed issuance processing according to one embodiment of the present invention.

FIG. 12 is a flowchart illustrating delayed issuance processing according to one embodiment of the present invention. This method may be implemented as a background task or may be triggered by write command processing.

Under delayed issuance processing, if the software disk driver queue is empty at decision block 1205 or the number of pending commands is greater than or equal to the throttle value at decision block 1210 no further processing is performed. However, if the software disk driver queue is not empty at decision block 1205 and the number of pending commands is less than the throttle value at decision block 1210, the next write command is dequeued from the software disk driver queue at processing block 1215. After the next write command is dequeued at processing block 1215 the outstanding command count is incremented at processing block 1220. Finally, the command is sent to the bus interface for issuance to the disk at processing block 1225.

What is claimed is:

1. A method comprising:

sending a write request to a storage device;

receiving a queue full signal from the storage device if a queue in the storage device is substantially close to full;

responsive to receiving the queue full signal setting a throttle value to a value greater than zero;

revisiting the throttle value after the expiration of a set time; and resetting the throttle value to its previous value if originally decremented due to a device busy signal from the storage device.

2. The method of claim 1, further comprising setting the throttle value to a maximum value if the throttle value is below a minimum value and a prior state of the device is not busy.

3. The method of claim 2, wherein said maximum value is equal to a number of outstanding commands.

4. The method of claim 1, wherein said set time equals 60 seconds.

5. The method of claim 1, wherein the storage device is a Fiber Channel SCSI disk drive.

6. The method of claim 5, wherein the disk drive is connected to a fabric via a fiber optic signal path.

7. The method of claim 6, wherein the fiber optic signal path uses a Fiber Channel protocol.

8. A method of throttling commands to a storage device comprising:

sending a write request to the storage device;

receiving a queue full or busy signal from the storage device if a queue in the storage device is full or busy;

responsive to receiving the queue full or busy signal setting a throttle value;

revisiting the queue full signal after the expiration of a set time; and resetting the throttle value to its previous value if originally decremented due to a busy signal from the storage device.

9. The method of claim 8, wherein the throttle value is equal to a number of outstanding commands.

10. The method of claim 8, wherein said set time equals 60 seconds.

11. The method of claim 8, wherein the storage device is a Fiber Channel SCSI disk drive.

12. The method of claim 11, wherein the disk drive is connected to a fabric via a fiber optic signal path.

13. The method of claim 12, wherein the fiber optic signal path uses a Fiber Channel protocol.

14. A system comprising:

a processor;

a storage device coupled with the processor, said storage device configured to send a queue full signal back to the processor in response to a write request by the processor whenever a queue in the storage device has been substantially filled, wherein said processor is further configured to:

set a throttle value to a value greater than zero;

revisit the throttle value after the expiration of a set time; and reset the throttle value to its previous value if originally decremented due to a device busy signal from the storage device.

15. The system of claim 14, wherein said storage device is a Fiber Channel SCSI disk drive.

16. The system of claim 15, wherein the disk drive is connected to a fabric through a fiber optic signal path.

17. The system of claim 16, wherein the fiber optic signal path uses a Fiber Channel protocol.

18. A machine-readable medium having stored thereon data representing sequences of instructions, the sequences of instructions which, when executed by a processor, cause the processor to perform the steps of:

sending a write request to a storage device;

receiving a queue full signal from the storage device if a queue in the storage device is substantially full;

responsive to receiving the queue full signal setting a throttle value to a value greater than zero;

revisiting the throttle value after the expiration of a set time; and resetting the throttle value to its previous value if originally decremented due to a device busy signal from the storage device.

19. The machine-readable medium of claim 18, further comprising setting the throttle value to a maximum value if the throttle value is below a minimum value and a prior state of the device is not busy.

20. The machine-readable medium of claim 19, wherein said maximum value is equal to a number of outstanding commands.

21. The machine-readable medium of claim 19, wherein said set time equals 60 seconds.

22. The machine-readable medium of claim 18, wherein the storage device is a Fiber Channel SCSI disk drive.

23. The machine-readable medium of claim 22, wherein the disk drive is connected to a fabric via a fiber optic signal path.

24. The machine-readable medium of claim 23, wherein the fiber optic signal path uses a Fiber Channel protocol.

25. A machine-readable medium having stored thereon data representing sequences of instructions, the sequences of instructions which, when executed by a processor, cause the processor to perform the steps of:

sending a write request to the storage device;

receiving a queue full or busy signal from the storage device if a queue in the storage device is full or busy;

responsive to receiving the queue full or busy signal setting a throttle value;

revisiting the queue full signal after the expiration of a set time; and resetting the throttle value to its previous value if originally decremented due to a busy signal from the storage device.

26. The machine-readable medium of claim 25, wherein the throttle value is equal to a number of outstanding commands.

27. The machine-readable medium of claim 25, wherein said set time equals 60 seconds.

28. The machine-readable medium of claim 25, wherein the storage device is a Fiber Channel disk drive.

29. The machine-readable medium of claim 28, wherein the disk drive is connected to a fabric via a fiber optic signal path.

30. The machine-readable medium of claim 29, wherein the fiber optic signal path uses a Fiber Channel protocol.

* * * * *